United States Patent [19]

Rakijas

[11] Patent Number: 5,783,944

[45] Date of Patent: Jul. 21, 1998

[54] PROCESSING METHOD FOR ESTIMATION OF MAGNETIZABLE OBJECT OR SOURCE

[75] Inventor: Michael Rakijas, Yorba Linda, Calif.

[73] Assignee: Hughes Electronics, Los Angeles, Calif.

[21] Appl. No.: 653,877

[22] Filed: May 28, 1996

[51] Int. Cl.$^6$ .................... G01R 33/02; G01B 7/00; G01V 3/00

[52] U.S. Cl. .................... 324/244; 324/207.22; 324/345; 364/560

[58] Field of Search .................... 324/345, 346, 324/244, 207.11, 207.13, 245, 256, 207.22, 326; 364/449.1, 559, 556, 561, 560, 562, 563

[56] References Cited

U.S. PATENT DOCUMENTS

| | | | |
|---|---|---|---|
| 5,239,474 | 8/1993 | Eaton, Jr. et al. | 364/449 |
| 5,337,259 | 8/1994 | Breed | 364/559 |
| 5,387,863 | 2/1995 | Lo et al. | 324/207.13 |
| 5,524,086 | 6/1996 | Kiyuna et al. | 364/527 |
| 5,589,769 | 12/1996 | Krahn | 324/207.26 |

Primary Examiner—Walter E. Snow
Attorney, Agent, or Firm—Leonard A. Alkov; William C. Schubert; Glenn H. Lenzen, Jr.

[57] ABSTRACT

A processing method that estimates the size and structural features of a magnetizable object or source from readings provided by an array of magnetic sensors. Using the method, an array of magnetic sensors generates magnetic reading derived from the source that are processed by selecting candidate positions for the location of the source. The correlation $B^T\hat{B}$ is maximized, where $B=Rm$ and $B$ is a vector of composite measurements from the array of magnetic sensors, $R$ is a projection matrix from the location of the magnetic source to the sensors, $\hat{B}$ is an estimated vector of composite measurements representative of what the true magnetic readings should be for a source at an assumed location 16, and m is a dipole strength vector. The maximum correlation is chosen which is indicative of the location and magnitude of the source. Candidate arrangements of sets of dipoles 11a symmetrically arranged about the chosen location of the source are then selected. Readings from the plurality of magnetic sensors are again processed to maximize the correlation $B^T\hat{B}$ over sets of positions corresponding to locations of the sets of symmetrically arranged dipoles. The maximum correlation is chosen which is indicative of the arrangement of dipoles that most closely resembles the structure of the source. This processing provides for a multiple position solution to the distribution of the magnetic source.

1 Claim, 2 Drawing Sheets

- 21 — PROVIDE AN ARRAY OF MAGNETIC SENSORS THAT GENERATE A PLURALITY OF MAGNETIC READINGS DERIVED FROM A MAGNETIC SOURCE

- 22 — SELECTING CANDIDATE POSITIONS FOR THE LOCATION OF THE SOURCE

- 23 — MAXIMIZING THE CORRELATION $B^T\hat{B}$, WHERE $B = Rm$, B IS A VECTOR OF COMPOSITE MEASUREMENTS FROM THE ARRAY OF MAGNETIC SENSORS, R IS A PROJECTION MATRIX FROM THE POSITION OF THE MAGNETIC DIPOLE TO THE SENSORS, $\hat{B}$ IS AN ESTIMATED VECTOR OF COMPOSITE MEASUREMENTS REPRESENTATIVE OF WHAT THE TRUE MAGNETIC READINGS SHOULD BE FOR A SOURCE AT AN ASSUMED LOCATION AND m IS A DIPOLE STRENGTH VECTOR

- 24 — SELECTING A MAXIMUM CORRELATION FROM THE CORRELATIONS, WHICH MAXIMUM CORRELATION IS INDICATIVE OF THE POSITION AND MAGNITUDE OF THE DIPOLE

- 25 — SELECTING CANDIDATE ARRANGEMENTS OF SETS OF DIPOLES SYMMETRICALLY ARRANGED ABOUT THE CHOSEN POSITION OF THE DIPOLE

- 26 — PROCESSING THE READINGS FROM THE PLURALITY OF MAGNETIC READINGS TO MAXIMIZE THE CORRELATION OF $B^TB$ OVER SETS OF POSITIONS CORRESPONDING TO THE LOCATIONS OF THE SETS OF SYMMETRICALLY ARRANGED DIPOLES

- 27 — SELECTING A MAXIMUM CORRELATION CORRESPONDING TO THE SETS OF POSITIONS, WHICH MAXIMUM CORRELATION IS INDICATIVE OF THE ARRANGEMENT OF DIPOLES THAT MOST CLOSELY RESEMBLES THE STRUCTURE OF THE DIPOLE AND THUS SPATIALLY CHARACTERIZES THE MAGNETIC STRUCTURE.

PROCESSING METHOD FOR ESTIMATION OF MAGNETIZABLE OBJECT OR SOURCE

BACKGROUND

The present invention relates generally to magnetometer processing methods, and more particularly, to a processing method that spatially characterizes magnetic structures using magnetometer data.

Ferrous and other magnetizable objects have magnetic dipole moments whose presence can be detected by magnetic sensors. Prior to recent developments in magnetic signal processing by the assignee of the present invention, magnetic sensors could be used to detect the presence but not the location of such magnetizable objects. Recent work by the assignee of the present invention has added the capability of estimating both the location and/or velocity of such objects and is disclosed in U.S. Pat. No. 5,239,474, U.S. patent application Ser. No. 08/611,352, filed Mar. 5, 1996, now U.S. Pat. No. 5,689,396 and U.S. patent application Ser. No. 08/636,617, filed Apr. 23, 1996 now U.S. Pat. No. 5,995,575, (having docket number PD-96087). The limitation of prior art processing is that it assumes that the magnetic moment associated with an object emanates from a single point. By using this assumption, each object has all its magnetizable material concentrated in its magnetic center. No information related to the size and shape of the structure is available because the object is assumed to have no real physical extent.

Thus, it is an objective of the present invention to provide for a processing method that spatially characterizes a magnetic structure by processing magnetometer data to localize different parts of the structure to estimate its overall dimensions.

SUMMARY OF THE INVENTION

To meet the above and other objectives, the present invention provides for a processing method that estimates the size and structural features of a magnetizable object from readings provided by an array of magnetic sensors. The method determines whether an object is present, and also characterizes the object itself based on its dimensions. This offers numerous advantages for applications that require additional information beyond whether a magnetizable object is present or not, including whether the object is the approximate size and shape of that which is expected.

More particularly, the present processing method comprises the following steps. An array of magnetic sensors is used to generate a plurality of magnetic readings derived from a magnetizable object, or magnetic dipole. The readings from the array of magnetic sensors are then processed by selecting candidate positions for the location of the dipole and then maximizing the correlation $B^T\hat{B}$, where B=Rm, and B is a vector of composite magnetic sensor measurements from the array of magnetic sensors, R is a projection matrix from the position of the magnetic dipole to the sensors, $\hat{B}$ is an estimate of what true magnetic readings should have been for a dipole in an assumed position, and m is the dipole strength vector. The maximum correlation is chosen which is indicative of the position and magnitude of the dipole.

Then, candidate arrangements of sets of dipoles symmetrically arranged about the chosen position of the dipole are selected. The readings from the plurality of magnetic sensors are again processed to maximize the correlation $B^T\hat{B}$ over sets of positions corresponding to the locations of the sets of symmetrically arranged dipoles. The maximum correlation is chosen which is indicative of the arrangement of dipoles that most closely resembles the structure of the dipole. This processing provides for a multiple position solution to the localization of multiple magnetic dipole.

The present invention thus provides for the estimation of the relative size and general shape of a magnetizable object from readings taken by an array of magnetic sensors. The present invention may thus be used in applications where an object that cannot be seen because it is concealed or buried can have its size and general shape distribution estimated.

The present invention improves upon the concepts identified in the above-identified patent and applications and interprets them in an entirely different way to apply them for a different purpose. The prior inventions of the present assignee provided for the localization of magnetic dipoles. The present invention localizes different parts of a single structure to estimate its overall dimensions.

By way of example, the present invention may be used to aide in buried toxic dump remediation by using magnetic sensors employed with the present invention to determine whether a drum burial site is composed of a few drums buried in one spot or a large number drums spread over an area without having to dig up the burial site to see. A traffic monitoring site can be established with magnetic sensors using the present invention to not only count vehicles but to sort the vehicles by size to better detail traffic patterns. The present invention may be used with any application that uses a magnetic array to detect the presence or absence of an object and can be used to estimate what kind of object it is by using its size as an indicator.

In a military environment, for example, deployed magnetic sensors used for covert monitoring can be used with the present invention to distinguish between vehicles passing a strategic choke point based on height, length and width. The present invention can be used to alert for large vehicles like tanks and mobile missile launchers and dismiss common, non-threat vehicles like cars and small trucks. The present invention may be used to determine the size and general shape of a buried facility, like a bunker, to allow better targeting since ground penetrating weapons require better and more accurate placement to be effective.

In nonmilitary environments, the present invention may be used to implement automated ship cargo monitoring in which objects, when loaded on to ships, can be tagged and cataloged by its general size and shape. This allows better packing options as well when linked with a cargo tracking system. Law enforcement may use the present invention to detect the presence and general size of a stolen vehicle hidden from view without entering and violating illegal search statutes.

Vehicle traffic monitoring and characterization using the present invention allows traffic patterns to be characterized by vehicle dimension and hence type, not just by count. This allows characterization of the road as being used by 18 wheel transports at certain times of the day versus passenger vehicles at other times.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 3 is a flow diagram illustrating a processing method in accordance with the principles of the present invention.

DETAILED DESCRIPTION

Figure 1:
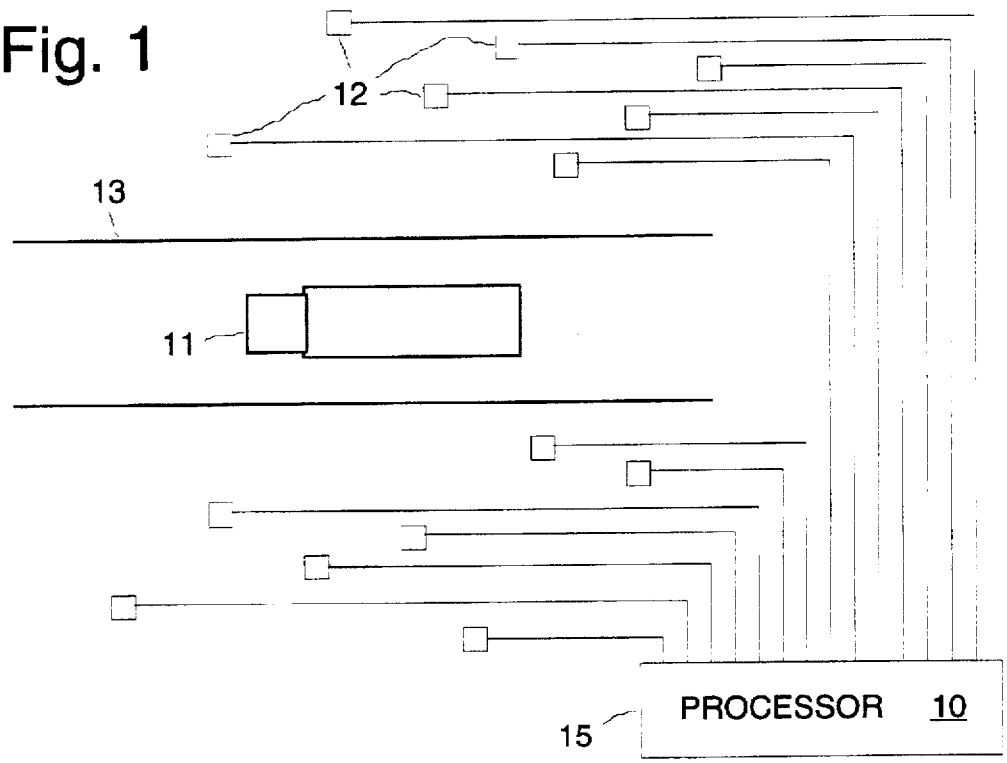
FIG. 1 is a top view of an embodiment of the present invention.
Figure 2:
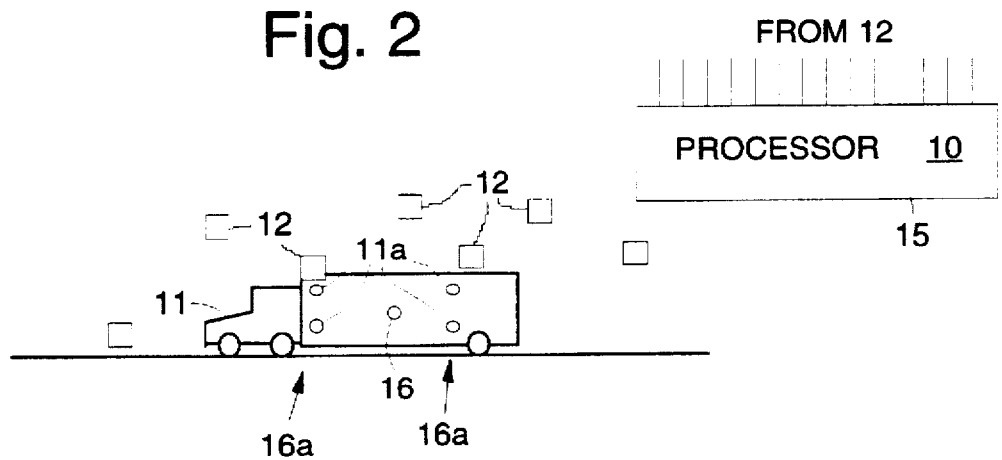
FIG. 2 is a side view of the embodiment of FIG. 1.

Referring to the drawing figures, FIGS. 1 and 2 show top and side views, respectively of an application using a processing method 10 in accordance with the principles of the present invention. FIG. 1 shows a large truck 11 (comprising a magnetic source 11 made up of a set of magnetic dipoles) on a road 13, and a plurality of magnetic sensors 12 disposed on either side of the road that are used to sense the magnetic field of the truck 11 relative to the earth's magnetic field. The relative positions of the plurality of magnetic sensors 12 is not critical, but their respective locations must be known. Each of the plurality of magnetic sensors 12 are coupled to a processor 15 that implements the processing method 10 of the present invention. In FIG. 2, the locations of the sensors 12 are shown at different heights above the road 13, but this is not absolutely required.

The present method 10 will be summarized with reference to FIG. 3 and then a mathematical description of the method 10 will be discussed for completeness. With reference to FIG. 3, it is a flow diagram illustrating the processing method 10 in accordance with the principles of the present invention.

The processing method 10 comprises the following steps. An array of magnetic sensors 12 is provided that generates 21 a plurality of magnetic readings derived from a magnetizable object 11, or magnetic source 11. Readings from the plurality of magnetic sensors 12 are then processed by selecting 22 a candidate position for the location 16 of the source 11 and then maximizing 23 the correlation $B^T \hat{B}$, where B=Rm, and B is a vector of composite measurements from the array of magnetic sensors 12, $\hat{B}$ is an estimated vector of composite measurements representative of what true magnetic readings should have been for a dipole in an assumed position, R is a projection matrix from the location 16 of the magnetic source 11 to the sensors 12, and m is a dipole strength vector. The maximum correlation is chosen 24 which is indicative of the location 16 and magnitude of the dipole 11.

Next, and in accordance with the present invention, candidate arrangements of sets of dipoles 11a are selected 25 that are symmetrically arranged about the chosen position of the source 11. Readings from the plurality of magnetic sensors 12 are again processed to maximize 26 the correlation $B^T \hat{B}$ over sets of positions corresponding to the locations 16a of the sets of symmetrically arranged dipoles 11a. The maximum correlation is chosen 27 which is indicative of the arrangement of dipoles 11a that most closely resembles the structure of the magnetic source 11. This processing provides for a multiple position solution to the localization of the magnetic source 11.

The processing method 10 is used to extract spatial extent information regarding magnetizable objects, such as the truck 11 or other magnetic source 11, from data generated by the array of magnetic sensors 12. The processing method 10 may be implemented using a one, two or three dimensional formulation depending on the application and is implementd using a method of successive approximation.

In the inventions disclosed in the above-identified patent and applications, the original form of the equations to find a single magnetic dipole 11 is as follows. First, the single dipole 11 is assumed to generate readings at the sensors 12 using the equation:

$$B = Rm$$

where B defines a vector of composite magnetic sensor measurements, R is the projection matrix from the position of the magnetic dipole 11 to the sensors 12, and m is the dipole strength vector. The measurements vector B and dipole strength vector m are defined by $$B = \begin{bmatrix} B_1 \\ B_2 \\ \cdots \\ B_N \end{bmatrix} \text{ and } m = \begin{bmatrix} m_x \\ m_y \\ m_z \end{bmatrix}$$

where there are N sensors 12. In this example, each of the $B_i$'s, I=1, 2 . . . . N, are vectors composed of the measurements from a three axis magnetic sensor (although a similar development can be done using a total field sensor) located in some arbitrary coordinate system. The dipole vector m is composed of the dipole strengths in each of the defined coordinate system directions. The R matrix is determined by the spatial separation between the dipole 11 and each of the sensors 12. This makes R a composite projection matrix defined by $$R = R(r_m) = \begin{bmatrix} R_1(r_m) \\ R_2(r_m) \\ \cdots \\ R_N(r_m) \end{bmatrix}$$

where each of the $R_i$'s projects from the dipole 11 to the $i^{th}$ sensor. Each of these can be written as follows $$R_i(r_d) = \frac{1}{r_i^5} \begin{bmatrix} 2r_{ix}^2 - r_{iy}^2 - r_{iz}^2 & 3r_{ix}r_{iy} & 3r_{ix}r_{iz} \\ 3r_{ix}r_{iy} & 2r_{iy}^2 - r_{ix}^2 - r_{iz}^2 & 3r_{iy}r_{iz} \\ 3r_{ix}r_{iz} & 3r_{iy}r_{iz} & 2r_{iz}^2 - r_{iy}^2 - r_{ix}^2 \end{bmatrix}$$

where $$r = \begin{bmatrix} r_{ix} \\ r_{iy} \\ r_{iz} \end{bmatrix} = r_{si} - r_m = \begin{bmatrix} r_{ix} \\ r_{iy} \\ r_{iz} \end{bmatrix} - \begin{bmatrix} r_{mx} \\ r_{my} \\ r_{mz} \end{bmatrix}$$

and $$r_i^5 = (r_{ix}^2 + r_{iy}^2 + r_{iz}^2)^{5/2}.$$

Specifically, $r_{si}$ is the location of the $i^{th}$ sensor described by the three coordinates in the defined coordinate system and $r_m$ is the location 16 of the magnetic source 11 with its respective coordinates. The processing used in the invention described in U.S. patent application Ser. No. 08/611,291, filed Mar. 5, 1996, entitled "Improved Dipole Moment Detector and Localizer", assigned to the assignee of the present invention, first supposes a location for $r_m$ to generate the matrix R and uses its pseudoinverse denoted by R* to find the estimate of the dipole strength for that location, $\hat{m}$. Mathematically, for the supposed location of $r_m$, this takes the form $$\hat{m} = R \backslash B$$

where $$R\dagger = (R^T R)^{-1} R^T.$$

One first supposes a range of possible source locations for $r_m$, and finds the one that maximizes the value of ρ where $$\rho = \frac{B^T \hat{B}}{\sqrt{(B^T B)(\hat{B}^T \hat{B})}}$$

$$\hat{B} = R\hat{m} = RR^+B.$$

Since this original work was done, a simpler form has been developed. Since B represents the sensor readings and is not dependent on R, then $B^T B$ is a constant. Also, one can show that $\hat{B}^T\hat{B}=\hat{B}\hat{B}^T$ using the above equations which means that maximizing ρ above is mathematically equivalent to maximizing $B^T\hat{B}$.

A one dimensional solution will now be discussed. The prior inventions only consider the localization of the object. Specifically, the location 16 of the object is concluded to be the $r_m$ that maximizes ρ. This invention uses the information provide by this result to make estimates of the spatial distribution of the object. The application determines the next step to be taken. Specifically, the invention assumes that most objects are regularly shaped so that they can be assumed to be approximately symmetric. Then, by assuming that dipoles are approximately evenly distributed about the location $r_m$ as the symmetry would dictate, a newer higher dimensional object can be approximated.

Generally, the approach proceeds as follows and can be described as a method governed by successive approximations. Locating $r_m$ finds the best single dipole solution of the magnetic source 11. The number of dipoles in the next solution must be chosen and depends on whether a 1, 2 or 3 dimensional solution is desired. Herein, 2, 4 or 8 dipole solutions are used to illustrate 1, 2 and 3 dimensional solutions, respectively, but the method is not restricted to those numbers of dipoles. If a one dimensional solution is desired, a two dipole vector m can be used as the basis of the distributed dipole 11 and is defined as $$m = \begin{bmatrix} m_1 \\ m_2 \end{bmatrix}$$

where the $m_i$'s each have x, y and z components as in the single dipole solution case in the previous invention. This makes m a 6 by 1 vector when using the two dipole formulation. The equations defining the projection of the dipole 11 into the measurements vector is similarly defined by $$B = R'm = [R_a R_b] \begin{bmatrix} m_1 \\ m_2 \end{bmatrix}$$

One innovative part of the present invention is the method for constructing $R_a$ and $R_b$. At this point, R has been found that maximizes p for the single dipole case. However, since R is a function of $r_m$.

$$R=R(r_m)$$

$r_m$ has also been found for the single dipole solution. If it is assumed that the object is regularly shaped, a one dimensional solution has its dipoles lie on a line. For the two dipole case, the R's can be symmetrically placed about the one dipole solution. Then $R_a$ and $R_b$ can be defined by $$R_a=R(r_m+r_\Delta) \text{ and } R_b=R(r_m-r_\Delta).$$

This places one dipole 11 of the two dipole solution at $r_\Delta$ away from the single dipole solution and the other $r_\Delta$ away in the opposite direction. Then, provided that enough measurements exist to form a solution (discussed later), the two dipole solution is found in a similar way to the original single dipole solution. Specifically, a set of possible values for $r_\Delta$ in a half space about the single dipole solution is identified. Only a half space needs to be searched because of the symmetry of having one dipole 11 in each half space. For each $r_\Delta$, the pseudoinverse of R' is used and a value for ρ is found. The value of $r_\Delta$ that maximizes the value of ρ generates the two dipole solution. The placement of the resulting dipoles, at $r_m \pm r_\Delta$ should lie along the major axis of the object and be separated by a distance that is roughly proportional to the actual size of the object.

The relation to the relative size of the object is dependent on a number of variables. The distance between the object and the array of magnetic sensors 12, the spatial separation between the sensors 12 of the array in relation to the size of the object and the aspect ratio of the object determine the specific proportionality of the dipole solution separation and the size of the object.

In the single dipole case, the solution is close to what could be considered the magnetic center. In the dual dipole case, under relatively ideal circumstances, the dipoles are close to the middle of their respective half object of the half space that is searched. In this case, the ratio of object length to dipole separation could be in the vicinity of two or three. The distance from the array of magnetic sensors 12 to the object also changes this ratio in that the further the object is from the array of sensors 12, the more likely it will behave as a point source and the greater the ratio of object length to dipole separation will be. For an array of magnetic sensors 12 that is closely spaced, object size estimates are not likely to be good either because the magnetic field around the object is not sufficiently sampled to see how it varies by position. This is the basis of the algorithm of the present invention. It uses the way the magnetic field varies over space and deviates from spherical symmetry of a true single dipole point source to estimate the object's form. If the field is not sufficiently sampled over a wide enough area, a good estimate of object size is difficult to obtain.

Two and three dimensional solutions will now be discussed. The aspect ratio of the object also affects results in that an elongated object has a two dipole solution (under reasonable circumstances) where the line between the two runs along the long axis of the object. In the case where two or all three dimensions of the object are similar or the same, two dipole results can be skewed under some conditions. In some tests that were performed, the line between the two dipoles in a two dipole solution of an object that has approximately equal dimensions sometimes runs along a diagonal of the object rather than along one of its axes. In this case, a solution residing along either one of the axes of an object is not sufficient to capture the deviation from spherical symmetry of the field around the distributed object. A two or three dimensional solution is more appropriate.

The two dimensional solution is found similarly but the formulation proceeds as follows. In this case, four dipoles are used to create a rectangle in two dimensions but a different number (three or more) can be used can be used if a priori information about the object being examined is known. Specifically, for projecting from four dipoles to the sensors 12, $$B = RM = [R_a R_b R_c R_d] \begin{bmatrix} m_a \\ m_b \\ m_c \\ m_d \end{bmatrix}$$

To construct $R_a$, $R_b$, $R_c$ and $R_d$, the same procedure as the two dimensional case is used except the dipoles are arranged in a rectangle. This can be expressed mathematically by defining $r_a$, $r_b$, $r_c$ and $r_d$ in terms of their coordinates for some values of x, y, and z. Suppose that the rectangle to be formed is in the z-plane referenced to a chosen coordinate system. Then $$r_a = r_m + \begin{bmatrix} x \\ y \\ 0 \end{bmatrix} ; r_b = r_m + \begin{bmatrix} x \\ -y \\ 0 \end{bmatrix} ;$$

$$r_c = r_m + \begin{bmatrix} x \\ -y \\ 0 \end{bmatrix} ; r_d = r_m + \begin{bmatrix} -x \\ -y \\ 0 \end{bmatrix} ;$$

and a solution is chosen as the choice of x's and y's that yield the largest ρ. This creates a rectangle in the z plane that is 2x by 2y in size and whose main axes lie on the x and y axes of the coordinate system. Similarly, a rectangle in the x plane varies the y and z dimensions of the form and a rectangle in the y plane varies the x and z dimensions. Other orientations can be used as appropriate for the application.

For three dimensions, an eight vector solution results in a consistent regularly shaped rectangular prism defined by vectors $r_a$ through $r_h$. Their coordinates are described by all combinations of pluses and minuses as $$r_{a,b,\ldots,h} = r_m + \begin{bmatrix} \pm x \\ \pm y \\ \pm z \end{bmatrix}$$

In all cases, provided there are a sufficient numbers of measurements, solutions are obtained in a similar manner as before. A systematic search through possible sets of r's is made, choosing the set that results in the maximum value of ρ. The result describes a set of dipoles whose separations are roughly proportional to the dimensions of the examined object provided the object is close enough and the magnetic field generated by the object is sufficiently sampled by the array of magnetic sensors 12.

The higher dimensional versions of the approach may be applied with different numbers of dipoles as well as in different arrangements. For example, if the examined objects are known to be cylindrical, then a cylindrical arrangement of dipoles should be the basis of the search sets. This might be applicable when searching for a buried 55 gallon drum. One can use the present invention to search over varying lengths and diameters of the cylindrical dipole arrangement and decide which (the one that maximizes ρ) is similar enough to the examined object. If it closely resembles the desired object, as opposed to another magnetizable buried object, the object can be considered found. The principle that needs to be applied is to make the maximum use of a priori information about the desired object and to arrange the dipoles in a way that mimics the general form of the object.

Orientations can be changed by rotating the coordinate system or by changing the values in the r vectors until the desired orientation is achieved. In many applications, the orientation is established by the application. For example, in the motor vehicle size estimation application, the orientation can be well assumed to be along the length of the road. In cases where it is not established in advance, other techniques can be used to estimate orientation.

The value of $r_m$ has been found for the single dipole solution and it has been shown how to find simple 1, 2 and 3 dimensional distributed dipole solutions. The two dipole solution is self orienting in that the best orientation for the single dimension is found automatically when the search is comprehensively created and completed. There are at least two methods to carry out orientation estimates for applications that do not have access to a priori information.

The first method is initially to find the one dimensional solution (even though a two or three dimensional solution is ultimately needed). The two dipole solution forms a line that most likely falls along the main axis of the object. This line is then used to define the coordinate system of a higher dimensioned search thereby determining the orientation of the improved solution. As mentioned earlier, the limitation of this method is that similarly dimensioned objects occasionally lead the two dipole solution to lie on the diagonal of the square or cube rather than parallel to a side. This can be corrected by examining whether the resulting estimated size has similar dimensions and has square faces (since even if the search space is improperly oriented, the inherent symmetry of the object will result in a subsequent solution that is fairly square). If it is, testing for increased ρ at other orientations allows for the correct orientation to be found. It has been shown in tests that the correct orientation does yield the highest value for ρ of all possible orientations.

The second method is based on an extension of the concept of successive approximation. First, an initial orientation (for either the 2 or 3 dimension solution) is choosen, the solution that maximizes ρ is found, and then all possible orientations for the resulting form are checked. If a better orientation is found (one with a greater ρ), a new search is made at the new orientation. To reduce computation, the new search can be limited so that it is in the vicinity of the dimensions of the resulting initial solution. If a new arrangement is found, orientation can again be verified and these successive steps can be alternated until the desired accuracy is achieved. This is the preferred method.

Each of the dipole arrangements is limited in this approach to the problem solution by the number of measurements. In the above discussion, it was assumed that three axis magnetometers are used (although this is not a restriction) which in turn generate three measurements for each of N sensors 12. Since each dipole 11 has three directional components, no more than N dipoles can be used in an arrangement. Otherwise, the degrees of freedom in the arrangement will be greater than the number of equations that govern the projection from the dipole 11 to the measurements and the system becomes undetermined. As an example, to generate an eight dipole solution, one needs at least eight magnetometers with three axes of measurements to come up with a meaningful solution.

Thus, a method of spatially characterizing magnetic structures using magnetometer data to therefore localize different parts of a single structure to estimate its overall dimensions has been disclosed. It is to be understood that the described embodiment is merely illustrative of some of the many specific embodiments which represent applications of the principles of the present invention. Clearly, numerous and varied other arrangements may be readily devised by those skilled in the art without departing from the scope of the invention.

What is claimed is:

1. A method of spatially characterizing a magnetic structure using magnetometer data to estimate its overall dimensions, said method comprising the steps of:

provproviding an array of magnetic sensors that generates a plurality of magnetic readings derived from a magnetic source;

processing readings from the array of magnetic sensors by selecting a plurality of candidate locations for the source and maximizing the correlation $B^T\hat{B}$ for each candidate location, where $B=Rm$, and B is a vector of composite measurements from the array of magnetic sensors, R is a projection matrix from the position of the magnetic source to the array of magnetic sensors, $\hat{B}$ is an estimated vector of composite measurements representative of what the true magnetic readings should be for a source at an assumed position, and m is a dipole strength vector;

selecting a maximum correlation from the correlations, which maximum correlation is indicative of the location and magnitude of the single dipole representation;

selecting candidate arrangements of sets of dipoles symmetrically arranged about the selected location of the source;

processing the readings from the sets of magnetic dipoles to maximize the correlation $B^T\hat{B}$ over sets of positions corresponding to the locations of the sets of symmetrically arranged dipoles; and selecting a maximum correlation corresponding to the sets of locations, which maximum correlation is indicative of the arrangement of dipoles that most closely resembles the magnetic structure of the source and thus spatially characterizes the magnetic structure of the source.

\* \* \* \* \*